US011794830B2

(12) United States Patent
Hunt et al.

(10) Patent No.: US 11,794,830 B2
(45) Date of Patent: Oct. 24, 2023

(54) SPROCKET LOCKING SEGMENTS

(71) Applicant: Caterpillar Inc., Peoria, IL (US)

(72) Inventors: Lewis C. Hunt, Sparland, IL (US); Donald John Kalmes, Peoria, IL (US); David J. Hakes, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 352 days.

(21) Appl. No.: 17/155,566

(22) Filed: Jan. 22, 2021

(65) Prior Publication Data

US 2022/0234659 A1 Jul. 28, 2022

(51) Int. Cl.
*B62D 55/13* (2006.01)

(52) U.S. Cl.
CPC .................................... *B62D 55/13* (2013.01)

(58) Field of Classification Search
CPC ....... B62D 55/13; B62D 55/12; B62D 55/135
See application file for complete search history.

(56) References Cited

U.S. PATENT DOCUMENTS 1,391,719 A 9/1921 Conyngham
2,824,458 A * 2/1958 Barland .................. F16H 55/30 474/162
5,176,500 A * 1/1993 Heinig .................. F01D 5/3007 416/219 R
5,253,816 A * 10/1993 Kastingschafer ...... H01B 3/301 492/38
5,257,909 A * 11/1993 Glynn .................. F01D 5/3015 416/220 R
5,657,681 A * 8/1997 Henricson ............... B02C 17/24 91/472
6,883,876 B2 * 4/2005 Yamamoto ........... B62D 55/088 305/196
7,823,990 B2 * 11/2010 Angot .................... B62D 55/20 305/195
10,451,165 B2 * 10/2019 Braedt ..................... B62M 9/14
2005/0175462 A1 * 8/2005 Lagrange .............. F01D 5/3007 416/219 R
2014/0154073 A1 * 6/2014 Cairo .................... F01D 5/3007 416/204 R
2016/0201556 A1 * 7/2016 Kolvick ................ F01D 5/3007 29/888.012

FOREIGN PATENT DOCUMENTS

CN 2706633 Y 6/2005

* cited by examiner

*Primary Examiner* — Scott A Browne

(57) ABSTRACT

A sprocket segment includes a body with an attachment web including a first circumferential end and a second circumferential end. A sprocket region extends radially outwardly from the attachment web, including a plurality of lugs. The first circumferential end includes a dovetail recess including a first side flat surface extending circumferentially and radially from the first circumferential end, a second side flat surface extending circumferentially and radially from the first circumferential end, and an arcuate bottom surface extending radially between the first side flat surface and the second side flat surface.

20 Claims, 7 Drawing Sheets

SPROCKET LOCKING SEGMENTS

TECHNICAL FIELD

The present disclosure relates to a sprocket used to drive a track chain assembly of an endless undercarriage drive employed by earth moving, construction and mining equipment and the like. Specifically, the present disclosure relates to a sprocket that has sprocket locking segments that help to share the load exerted on the sprocket during use.

BACKGROUND

Earth moving, construction and mining equipment and the like are often used in rough, off-road terrain. These machines often employ an endless drive with track shoes that is better able to propel the machines in such environments over obstacles and uneven terrain, etc. The track chain assemblies, which include shoes, are held together by a series of interconnected track links, pins and bushings that are supported on the drive sprocket, idler and support rollers of the machine. The drive sprocket, is so called, as it may drive or convey power to the track chain assembly, causing it to revolve about the idler wheels, resulting in linear motion of the machine.

The drive sprocket includes lugs that fit between various inside and outside links of the track chain assembly and typically contact a track chain bushing that spans between the adjacent inside track links and outside track links. As the drive sprocket rotates, a first lug pushes the track chain assembly along a direction by pushing on the track chain bushing. Eventually, the first lug disengages the track chain bushing as a second lug disposed immediately behind the first lug contacts another track chain bushing, forcing the track chain assembly to continue to move along the same direction.

There can be a great deal of lateral force and vertical force exerted on the sprockets that may lead to one or more of the lugs wearing to a point that the sprocket needs to be replaced. Consequently, sprocket segments are often employed that contain a few of the lugs so that only the sprocket segment with the worn lug needs to be replaced rather than the entire sprocket assembly. This reduces the time and cost for fixing the sprocket assembly. However, these sprockets segments spread the load over fewer fasteners for each individual segment, which may cause the fasteners to wear quicker than desired, also necessitating replacement or maintenance.

Chinese Pat. No. CN 2706633Y discloses a sprocket that is used on a motorcycle that includes two halves that have two ends, with each end having a male and female feature that mates the corresponding female and male feature of the adjacent sprocket half. This patent does not disclose a sprocket that is designed with suitable strength or properties to be used on heavy equipment such as that described herein. Therefore, one skilled in the art of heavy equipment design as described herein would not look to this prior art for a solution to the aforementioned problems, nor would one skilled in the art expect the sprocket disclosed in this Chinese patent to work satisfactorily on heavy equipment.

SUMMARY

A sprocket assembly according to an embodiment of the present disclosure may comprise a cylindrical hub defining an axis of rotation, a radial direction, and a circumferential direction. A circumferential surface may extend about the axis, and the hub may define a plurality of mounting holes extending axially into the cylindrical hub, being disposed radially adjacent the circumferential surface. A first sprocket segment may include a first attachment web including a first circumferential end and a second circumferential end, and a first plurality of mounting apertures extending axially through the first attachment web in alignment with the plurality of mounting holes of the cylindrical hub. The first sprocket segment may include a first sprocket region extending radially outwardly from the first attachment web, including a first plurality of radially outwardly extending lugs, and the first circumferential end may include a single dovetail recess, while the first sprocket region defines a first sprocket region axial width, and the first attachment web defines a first web axial thickness that is less than the first sprocket region axial width. A second sprocket segment may include a second attachment web including a first circumferential extremity and a second circumferential extremity. A second plurality of mounting apertures may extend axially through the second sprocket segment that are in alignment with the plurality of mounting holes of the cylindrical hub. A second sprocket region may extend radially outwardly from the second attachment web, including a second plurality of radially outwardly extending lugs. The first circumferential extremity may include a single dovetail projection that mates with the single dovetail recess of the first sprocket segment, while the second sprocket region defines a second sprocket region axial width, and the second attachment web defines a second web axial thickness that is less than the second sprocket region axial width.

A sprocket segment according to an embodiment of the present disclosure may comprise a body having an arcuate surface defining a circumferential direction, a radial direction, and an axis of rotation. The body may include an attachment web including a first circumferential end and a second circumferential end, and a plurality of mounting apertures extending axially through the body. A sprocket region may extend radially outwardly from the attachment web, including a plurality of radially outwardly extending lugs. The first circumferential end may include a dovetail recess including a first side flat surface extending circumferentially and radially from the first circumferential end, a second side flat surface extending circumferentially and radially from the first circumferential end, and an arcuate bottom surface extending radially between the first side flat surface and the second side flat surface.

A sprocket segment according to another embodiment of the present disclosure may comprise a body having an arcuate surface defining a circumferential direction, a radial direction, and an axis of rotation. The body may include an attachment web including a first circumferential end and a second circumferential end, and a plurality of mounting apertures extending axially through the body. A sprocket region may extend radially outwardly from the attachment web, including a plurality of radially outwardly extending lugs. The first circumferential end may include a dovetail projection including a first side straight surface extending circumferentially and radially from the first circumferential end, a second side straight surface extending circumferentially and radially from the first circumferential end, and an arcuate top surface extending radially between the first side straight surface and the second side straight surface, the arcuate top surface defining the first circumferential end.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
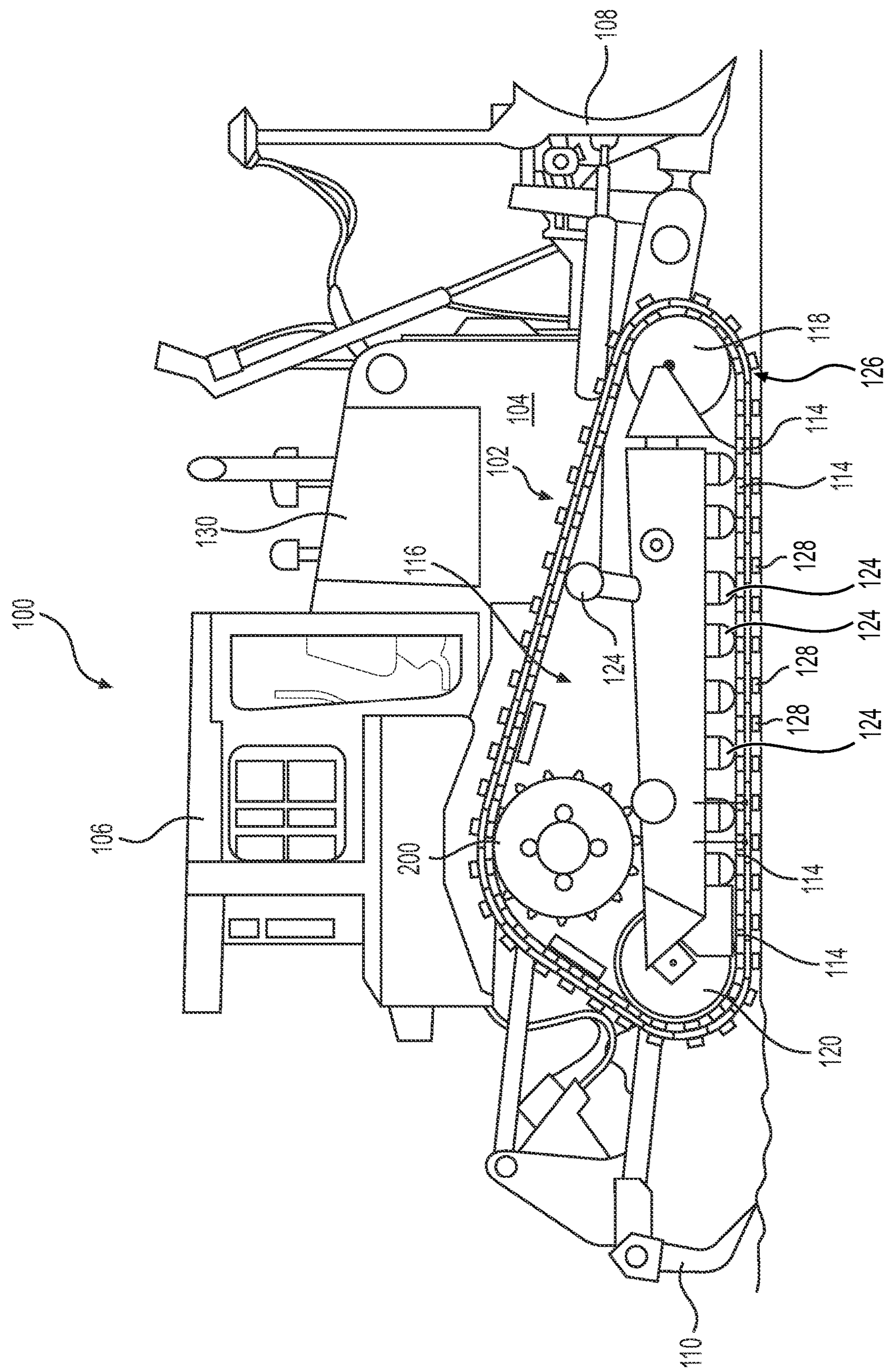
FIG. 1 is a side-view of a machine such a bulldozer that may use sprocket locking segments in its undercarriage according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

An undercarriage assembly that may use a sprocket assembly or a sprocket segment according to various embodiments of the present disclosure will now be described.

FIG. 1 shows an embodiment of a tracked machine 100 in the form of a bulldozer that includes an embodiment of a sprocket assembly 200 constructed in accordance with principles of the present disclosure. Among other uses, a bulldozer may be used to break up ground using a rake, push ground using a blade, or pick up dirt or rocks using a bucket, etc.

While the arrangement is illustrated in connection with a bulldozer, the arrangement disclosed herein has universal applicability in various other types of machines that commonly employ track systems, as opposed to wheels. The term "machine" may refer to any machine that performs some type of operation associated with an industry such as mining, earth moving or construction, or any other industry known in the art. For example, the machine may be an excavator, a wheel loader, a cable shovel, a track type tractor, a hydraulic mining shovel, or dragline or the like. Moreover, one or more implements may be connected to the machine. Such implements may be utilized for a variety of tasks, including, for example, lifting and loading.

As shown in FIG. 1, the machine 100 may include a body 104, with a track system 102 attached thereto, and also has a cab 106 to house a machine operator. The machine may also include a blade assembly 108 pivotally connected at one end to the body 104 and a rake assembly 110 at an opposing, distal end. In embodiments, the blade assembly or rake assembly can be any suitable implement, or may be omitted in other embodiments of the present disclosure. A control system can be housed in the cab 106 that can be adapted to allow a machine operator to manipulate and articulate the blade assembly and/or rake assembly for digging, excavating, or any other suitable application.

The track system 102 may include first and second track roller frame assemblies 116, which are spaced from and adjacent respective first and second sides of the machine 100. It will be appreciated that only one of the track roller frame assemblies 116 is visible in FIG. 1.

Each of the track roller frame assemblies 116 carries a front idler wheel 118, a rear idler wheel 120, a drive sprocket assembly 200, and a plurality of track guiding rollers 124. The drive sprocket assembly 122, is powered in forward and reverse directions by the machine 100. An endless track chain assembly 126 encircles each drive sprocket assembly 200, the idler wheels 118 and 120, and the track guiding rollers 124. The track chain assembly 126 includes a plurality of interconnected track links 114 with a plurality of track shoes 128 attached thereto. The track guiding rollers 124 guide the track links 114 as the track chain assembly 126 is driven by the drive sprocket wheel assembly 200. The track chain assembly 126 may have any track chain member, track pin retention device, and/or track chain assembly. A power source 130 supplies the power to drive the track chain assembly 126 via the sprocket assembly 200, as the lugs (discussed in more detail later herein) of the drive sprocket assembly 200 engage the various track bushings (not shown in FIG. 1), propelling the movement of the track chain assembly 126 as described earlier herein. While an elevated track drive is illustrated, other drives without an elevated sprocket are contemplated to be with the scope of the present disclosure.

Power source 130 may drive the sprocket assembly 200 of machine 100 at a range of output speeds and torques. Power source 130 may be an engine such as, for example, a diesel engine, a gasoline engine, a gaseous fuel-powered engine, or any other suitable engine. Power source 130 may also be a non-combustion source of power such as, for example, a fuel cell, a power storage device, or any other source of power known or that will be devised in the art.

Figure 2:
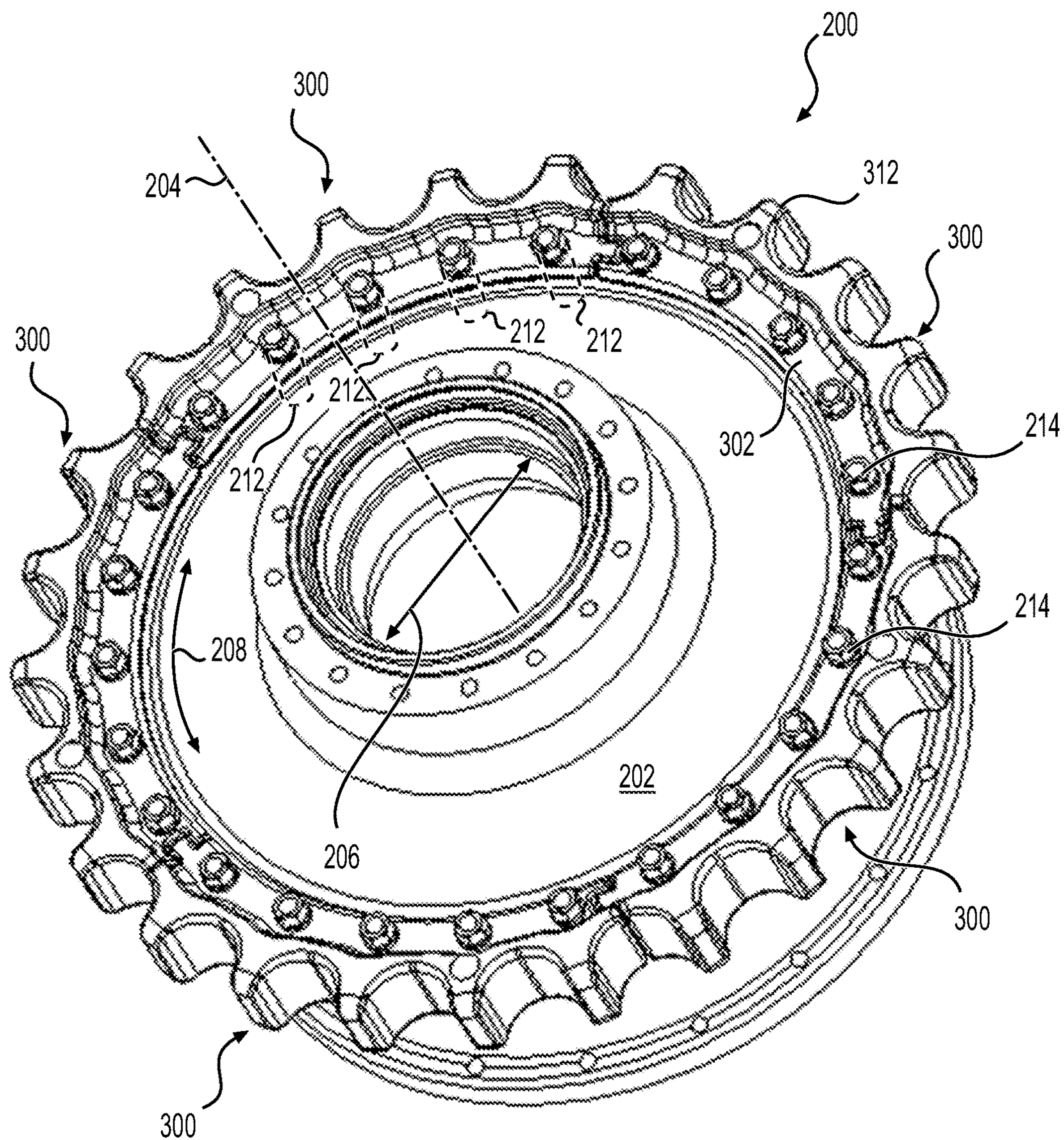
FIG. 2 is a perspective view of a sprocket assembly that may be used in the undercarriage of the machine of FIG. 1.
Figure 3:
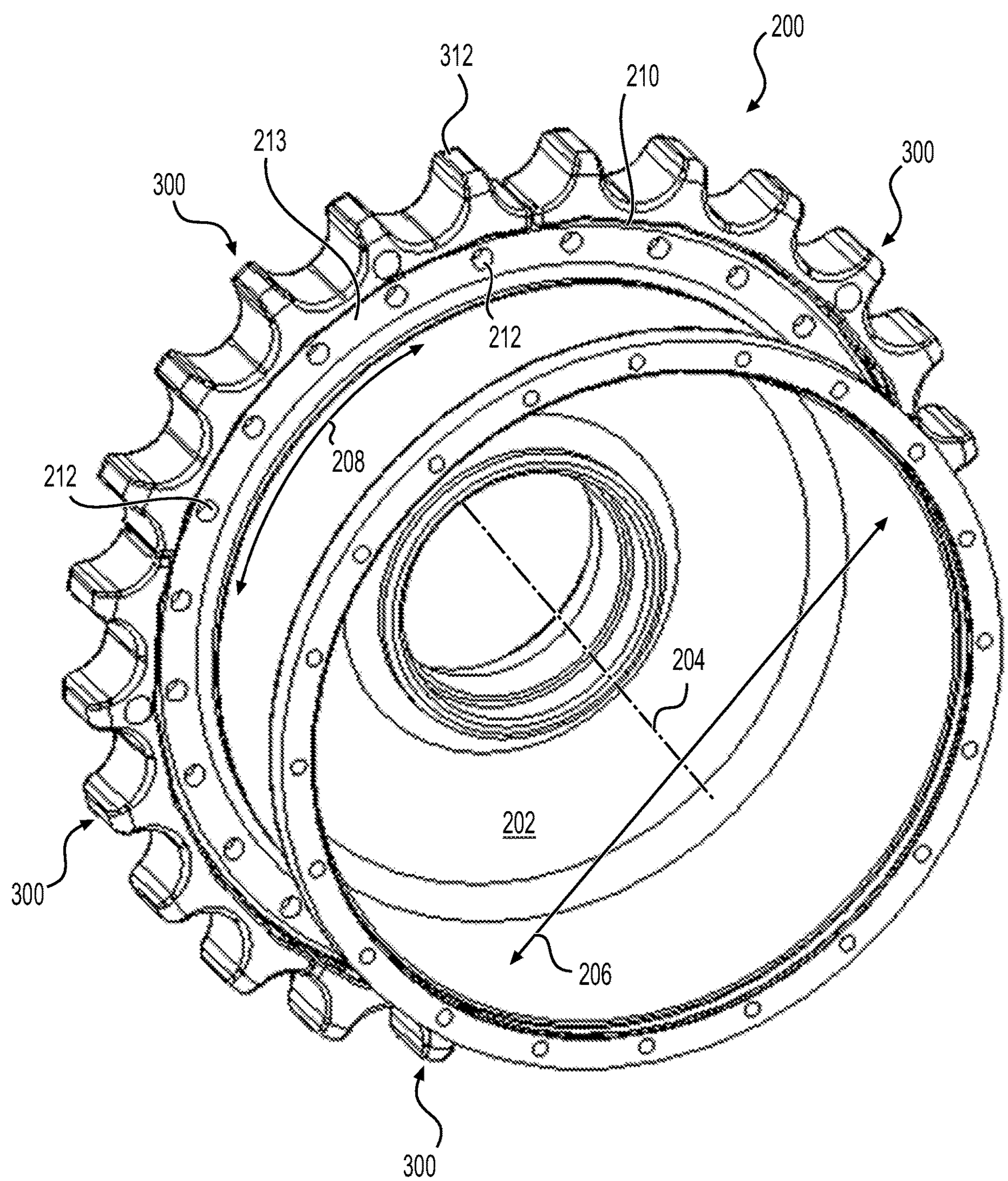
FIG. 3 is a rear perspective view of the sprocket assembly of FIG. 2, revealing its mounting flange and mounting holes for attaching the sprocket locking segments to the hub.

Turning now to FIGS. 2 and 3, details of the sprocket assembly 200 according to an embodiment of the present disclosure will now be discussed in further detail.

Such a sprocket assembly 200 may comprise a cylindrical hub 202 (i.e., that hub has at least partially a cylindrical configuration) defining an axis of rotation 204, a radial direction 206, and a circumferential direction 208. A circumferential surface 210 may extend about the axis of rotation 204, while a plurality of mounting holes 212 may extending axially into the cylindrical hub 202 (see FIG. 3). These mounting holes 212 may be threaded to receive fasteners (e.g., cap screws) that attach the sprocket segments that will be described herein momentarily. Or, these mounting holes may be clearance holes that allow a fastener 214 (e.g., a bolt as shown in FIG. 2) to pass through a flange 213 of the hub 202, exposing a free threaded end of the fastener to which a nut may be tightened to retain the sprocket segment to the hub. To that end, these mounting holes 212 may be disposed radially adjacent the circumferential surface 210, and allowing the sprocket segments 300 to extend radially past the circumferential surface 210 so the lugs 312 may engage the bushings of the track chain assembly.

Figure 6:
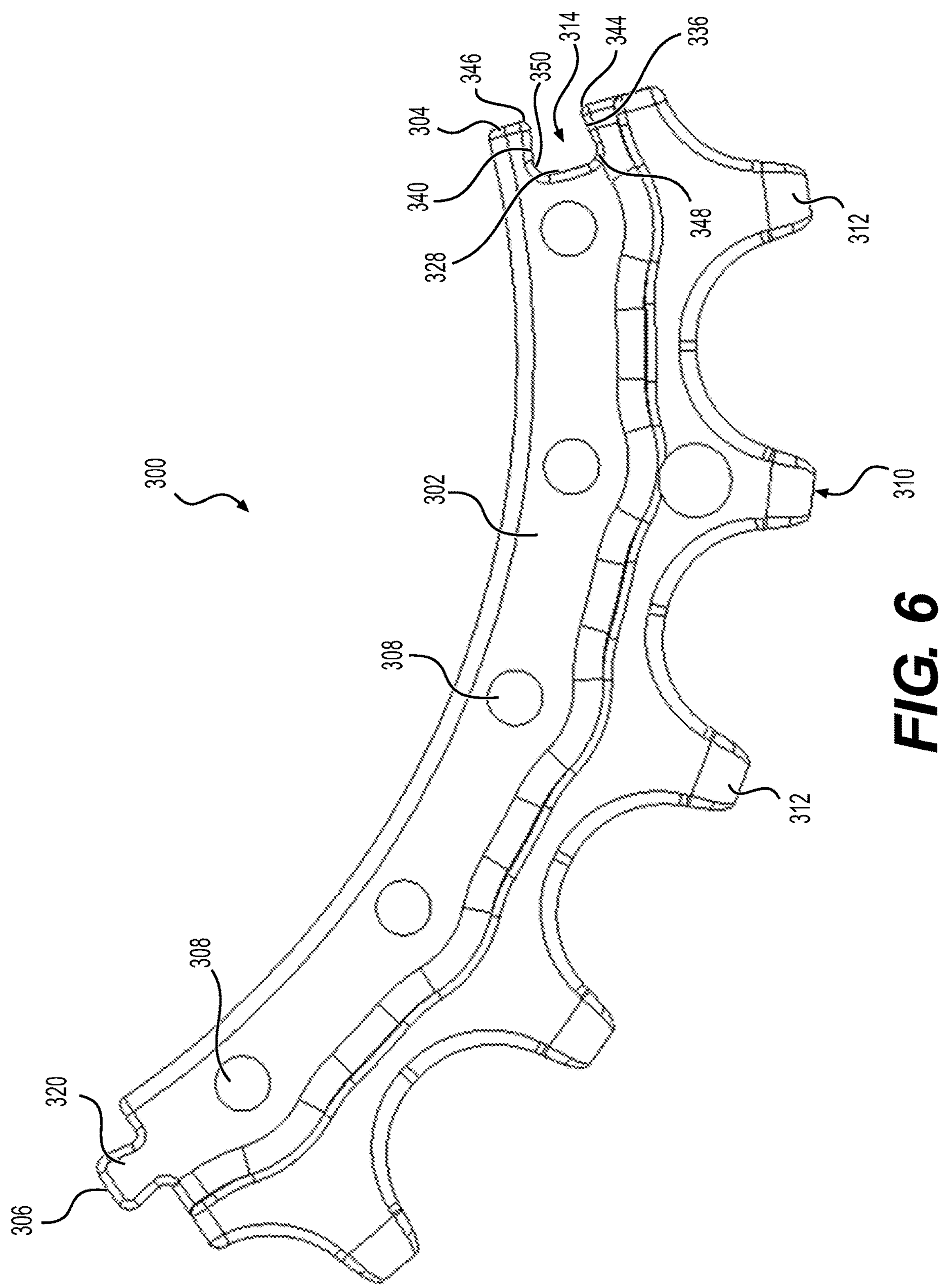
FIG. 6 is a front view of a single instance of a sprocket locking segment shown in FIG. 4.

A first sprocket segment 300 may be attached to the cylindrical hub 202. The first sprocket 300 may include a first attachment web 302 that includes a first circumferential end 304, and a second circumferential end 306 (as best seen in FIG. 6), and a first plurality of mounting apertures 308 extending axially through the first attachment web 302 that are in alignment with the plurality of mounting holes 212 of the cylindrical hub 202 for receiving the fasteners 214 as just described above herein.

A first sprocket region 310 extends radially outwardly from the first attachment web 302, including a first plurality of radially outwardly extending lugs 312. The first circumferential end 304 may include a single dovetail recess 314. Also, the first sprocket region 310 may define a first sprocket region axial width W310, and the first attachment web 302 may define a first web axial thickness T302 that is less than the first sprocket region axial width W310 (see also FIG. 4).

Figure 4:
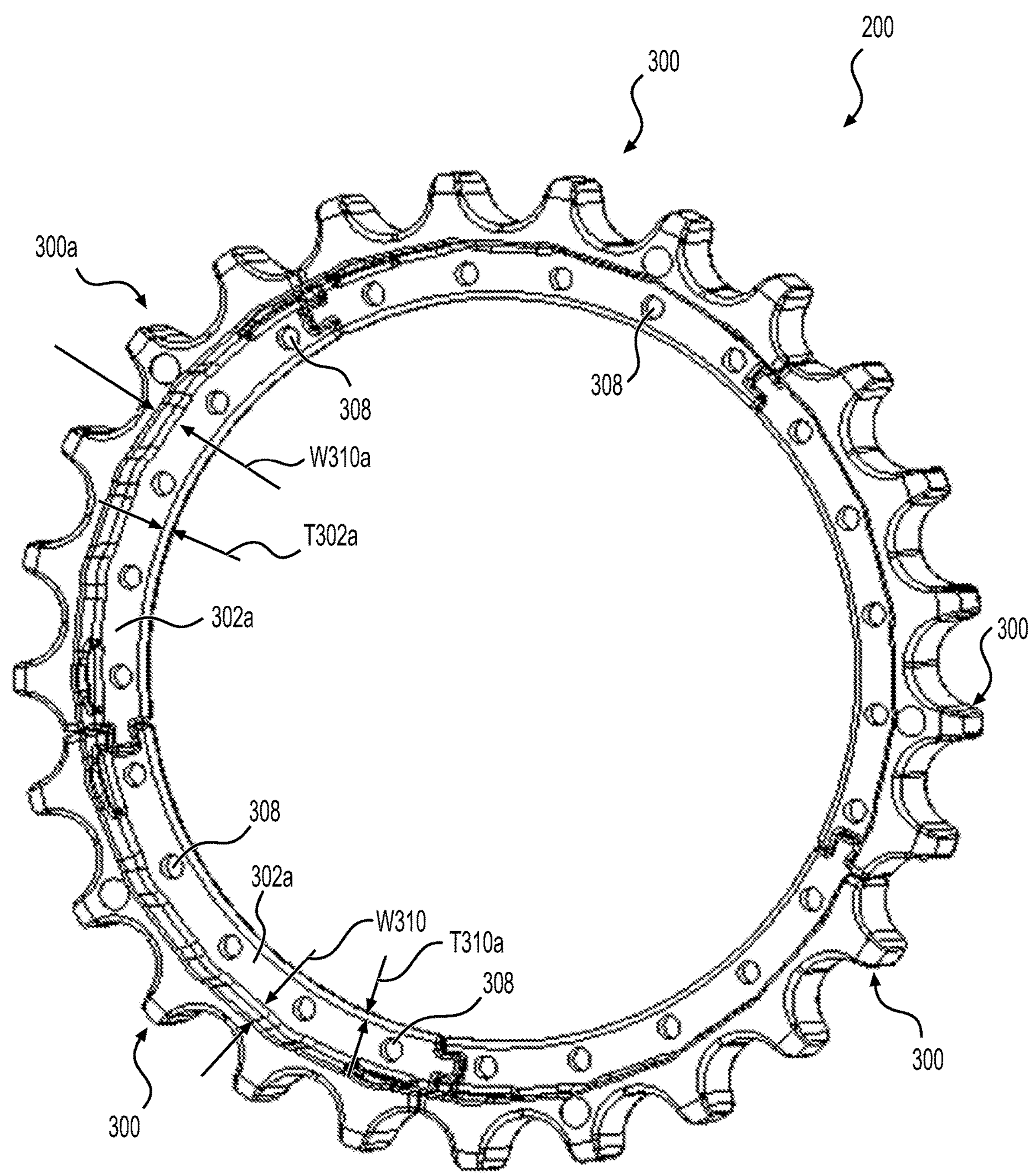
FIG. 4 is a rear perspective view of the sprocket locking segments of the sprocket assembly of FIG. 3, shown in isolation from the hub.
Figure 7:
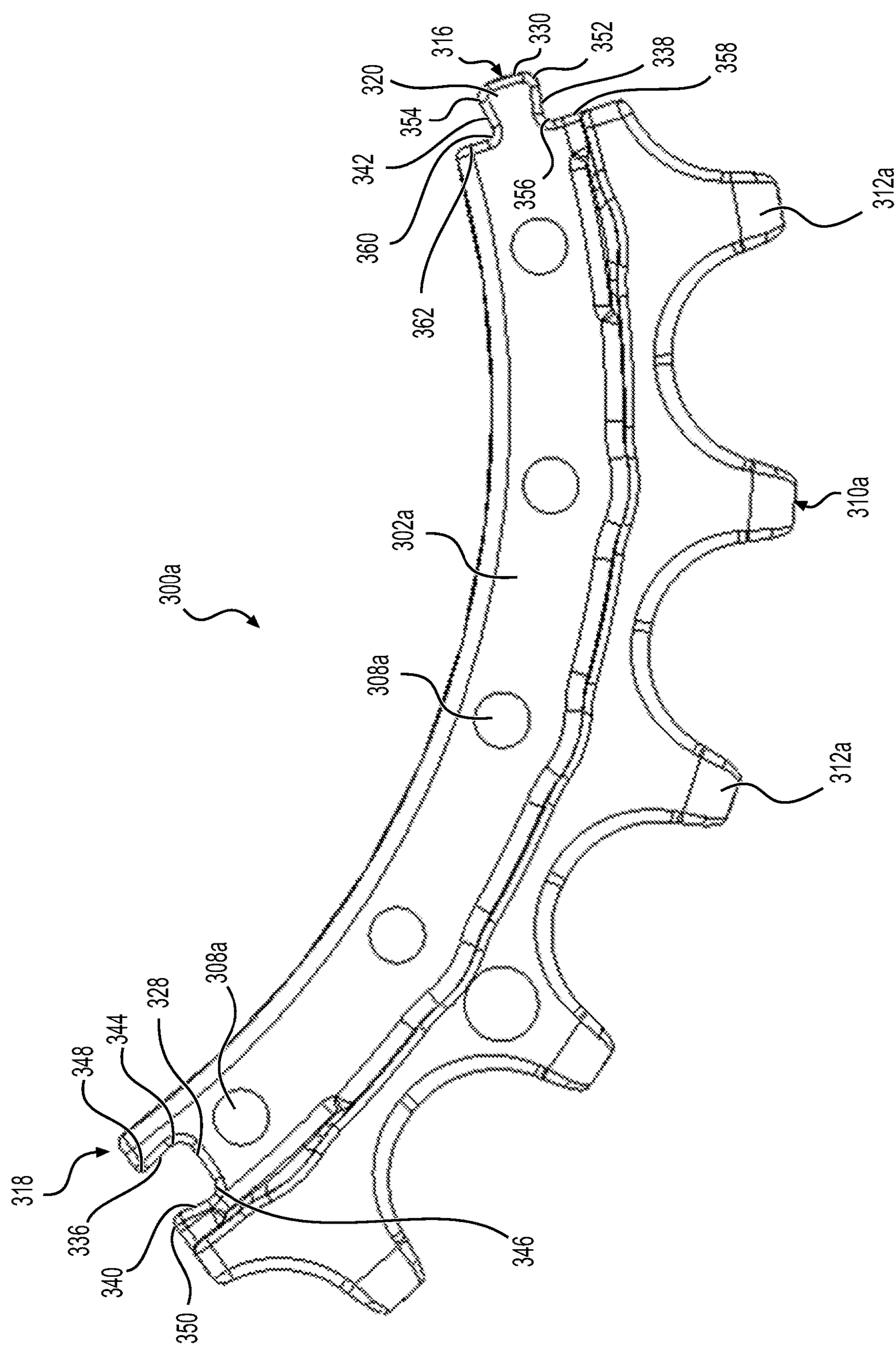
FIG. 7 is a rear oriented perspective view of the sprocket locking segment of FIG. 6.

With continued reference to FIGS. 4 and 7, a second sprocket segment 300*a* may include a second attachment web 302*a* including a first circumferential extremity 316, and a second circumferential extremity 318. A second plurality of mounting apertures 308*a* may extend axially through the second sprocket segment 300*a* that are in alignment with the plurality of mounting holes 212 of the cylindrical hub 202 for fastening as previously described herein.

Figure 5:
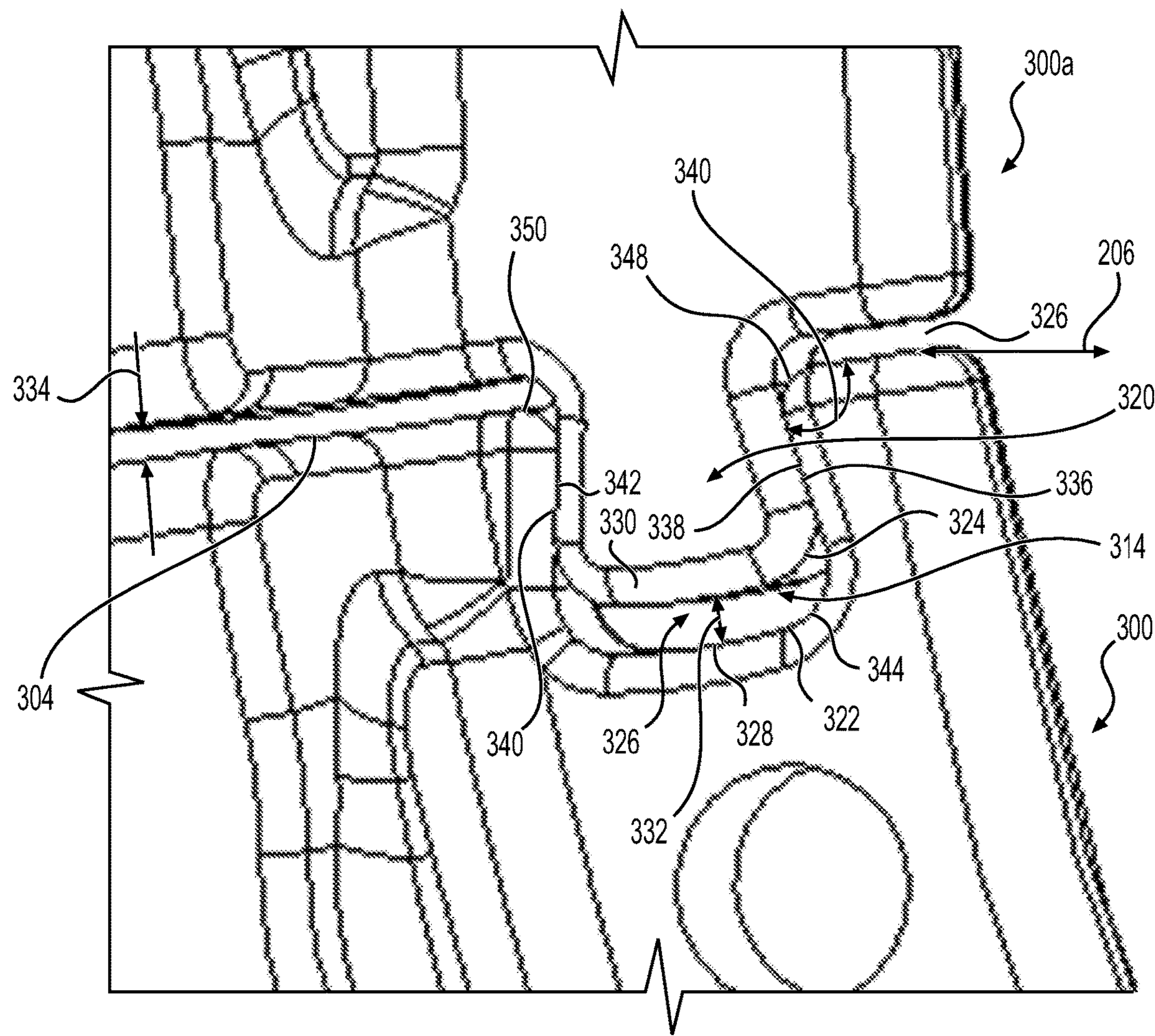
FIG. 5 is enlarged detail view of the interface of two sprocket locking segments used in the sprocket assembly of FIG. 4.

The second sprocket segment 300*a* may include a second sprocket region 310*a* that extends radially outwardly from the second attachment web 302*a*, including a second plurality of radially outwardly extending lugs 312*a*. The first circumferential extremity 316 may include a single dovetail projection 320 that mates with the single dovetail recess 314 of the first sprocket segment 300 (being disposed therein as shown in FIG. 5). The second sprocket region 310*a* defines a second sprocket region axial width W310*a*, and the second attachment web 302*a* defines a second web axial thickness T302*a* that is less than the second sprocket region axial width W310*a* (see FIG. 4).

Looking more closely at FIG. 5, the single dovetail recess defines a recess outline 322, while the single dovetail projection 320 defines a projection perimeter 324 that is at least partially offset from the recess outline 322, creating one or more gaps 326 between the projection perimeter 324 and the recess outline 322.

More specifically, the single dovetail recess 314 includes a concave arcuate surface 328 that extends predominantly radially, and the single dovetail projection 320 includes a convex arcuate surface 330 that may also extend predominantly radially, and that defines the first circumferential extremity 316. As shown in FIG. 3, the convex arcuate surface 330 may be offset from the concave arcuate surface 328 a first offset distance 332 that ranges from greater than 0 mm to 10.0 mm (e.g., may range from 2.0 mm to 4.7 mm with a nominal value of 3.7 mm) in some embodiments of the present disclosure.

Likewise, the first circumferential end 304 of the first sprocket segment 300 may be spaced circumferentially away from the second sprocket segment 300*a* a second offset distance 334 that ranges from greater than 0 mm to 10.0 mm (e.g., may range from 1.5 mm to 3.5 mm with a nominal value of 2.5 mm) in certain embodiments of the present disclosure.

The single dovetail recess 314 includes a first undercut surface 336, whereas the single dovetail projection 320 includes a first side face 338 that contacts the first undercut surface 336. As a result, radial and circumferential loads may be shared between the first sprocket segment 300, and the second sprocket segment 300*a*.

Some symmetry may be provided about a cylindrical surface that radially splits the single dovetail projection 320, and the single dovetail recess 314. As a result, the single dovetail recess 314 includes a second undercut surface 340, and the single dovetail projection 320 includes a second side face 342 that contacts the second undercut surface 340. This provides another interface for sharing loads.

In the embodiments shown, the first undercut surface 336, the second undercut surface 340, the first side face 338, and the second side face 342 are all flat in order to help maximize the surface area through which these loads are transmitted. For that purpose, the first side face 338 may be parallel to the first undercut surface 336, and the second side face 342 may be parallel to the second undercut surface 340. This might not be the case in other embodiments of the present disclosure.

In addition, the first side face 338 may form an acute angle 340 with the radial direction 206 that ranges from 2.0 degrees to 20.0 degrees (e.g., may range from 5.0 degrees to 15.0 degrees with a nominal value of 10.0 degrees) in some embodiments of the present disclosure.

To maximize design flexibility and reduce manufacturing cost, the first sprocket member 300, and the second sprocket member 300*a* may have identical configurations as shown in FIGS. 2 thru 4. So, sets of segments may be arranged as a circular array to about the hub to form the assembly. This may not be the case for other embodiments of the present disclosure.

Next, a sprocket segment that may be used to assemble the sprocket assembly 200 as just described herein, or as a replacement part will now be described with reference to FIGS. 5 and 6. The sprocket segment 300 may comprise a body having an arcuate surface (e.g. a cylindrical surface, a conical surface, etc.) defining a circumferential direction (e.g. may be the same as 208 once the sprocket assembly 200 is assembled), a radial direction (e.g. may be the same as 206 once the sprocket assembly 200 is assembled), and an axis of rotation (e.g. may be the same as 204 once the sprocket assembly 200 is assembled). The body may include an attachment web (e.g., see 302) including a first circumferential end 304, and a second circumferential end 306. A plurality of mounting apertures 308 may extend axially through the body. A sprocket region 310 may extend radially outwardly from the attachment web, including a plurality of radially outwardly extending lugs 312 as previously described herein.

The first circumferential end 304 may include a dovetail recess (e.g., see 314) including a first side flat surface (e.g., see 336) extending circumferentially and radially from the first circumferential end 304, a second side flat surface (e.g., see 340) extending circumferentially and radially from the first circumferential end 304, and an arcuate bottom surface (e.g., see 328) extending radially between the first side flat surface and the second side flat surface.

Also, the dovetail recess may include a first blend 344 (e.g., a concave radius) tangentially connecting the first circumferential end 304 to the first side flat surface (e.g., see 336), and a second blend 346 (e.g., a concave radius) tangentially connecting the first circumferential end 304 to the second side flat surface (e.g., see 340).

The dovetail recess may include a third blend 348 (e.g., a convex radius) tangentially connecting the first side flat surface (e.g., see 336) to the arcuate bottom surface (e.g., see 328), and a fourth blend 350 (e.g., a convex radius) tangentially connecting the second side flat surface (e.g., see 340) to the arcuate bottom surface.

On the other hand, the second circumferential end 306 may be defined by a dovetail projection (e.g., see 320). As alluded to earlier herein, the first circumferential end 304 may lack a dovetail projection, while the second circumferential end 306 may lack a dovetail recess. This may not be the case in other embodiments of the present disclosure.

A sprocket segment 300*a* (see FIG. 7) according to another embodiment of the present disclosure may also comprise a body with an arcuate surface including an attachment web 302*a* including a first circumferential end (e.g., see 316), and a second circumferential end (e.g., see 318), and a plurality of mounting apertures 308*a* extending axially through the body.

A sprocket region 310*a* may extend radially outwardly from the attachment web 302*a*, including a plurality of radially outwardly extending lugs 312*a*. The first circumferential end includes a dovetail projection (e.g., see 320) including a first side straight surface (e.g., see 338) extending circumferentially and radially from the first circumferential end, a second side straight surface (e.g., see 342) extending circumferentially and radially from the first circumferential end, and an arcuate top surface (e.g., see 330) extending radially between the first side straight surface and the second side straight surface. The arcuate top surface may define the first circumferential end.

Moreover, the dovetail projection (e.g., see 320) may include a first transitional surface 352 (e.g., a radius, a chamfer, etc.) connecting the arcuate top surface (e.g., see 330) to the first side straight surface (e.g., see 338), and a second transitional surface 354 connecting the arcuate top surface (e.g., see 330) to the second side flat surface (e.g., see 342).

More particularly, the first transitional surface 352 may be a first radius that tangentially connects the arcuate top surface to the first side straight surface (e.g., see 338), and the second transitional surface 354 may be a second radius that tangentially connects the acuate top surface (e.g., see 330) to the second side straight surface (e.g., see 342). The dovetail projection (e.g., see 320) may include a third radius 356 that tangentially connects the first side straight surface (e.g., see 338) to a first radially extending surface 358, and a fourth radius 360 that tangentially connects the second side straight surface (e.g., see 342) to a second radially extending surface 362.

As alluded to earlier herein, the second circumferential end (e.g., see 316) may be defined by a dovetail recess (e.g., see 314) and may lack a dovetail projection, while the first circumferential may lack a dovetail recess.

Any of the aforementioned features may be differently configured or dimensioned than what has been specifically described herein in various embodiments of the present disclosure.

For many embodiments, the sprocket segment and/or hub may be cast using iron, grey-iron, steel or other suitable materials. Other manufacturing processes may be used such as any type of machining, forging, etc. For example, steel or "tough steel" may be used to create the lugs. Lugs may also be coated, heat treated, etc. to provide suitable characteristics for various applications.

INDUSTRIAL APPLICABILITY

In practice, a sprocket assembly, a sprocket segment, and an undercarriage assembly according to any embodiment described herein may be sold, bought, manufactured or otherwise obtained in an OEM (original equipment manufacturer) or after-market context.

The various embodiments of the interlocking sprocket segments may help to share the loads between adjacent segments, reducing the load borne by any single segment or its fasteners, etc.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A sprocket assembly comprising:

a cylindrical hub defining an axis of rotation, a radial direction, and a circumferential direction, a plurality of mounting holes extending axially into the cylindrical hub;

a first sprocket segment including:

a first attachment web including a first circumferential end and a second circumferential end, and a first sprocket region extending radially outwardly from the first attachment web and including a first plurality of radially outwardly extending lugs, wherein the first circumferential end includes a single dovetail recess, wherein the first sprocket region defines a first sprocket region axial width, and wherein the first attachment web defines a first web axial thickness that is less than the first sprocket region axial width; and a second sprocket segment including:

a second attachment web including a first circumferential extremity and a second circumferential extremity, and a second sprocket region extending radially outwardly from the second attachment web and including a second plurality of radially outwardly extending lugs, wherein the first circumferential extremity includes a single dovetail projection that mates with the single dovetail recess of the first sprocket segment, wherein the single dovetail projection includes a first side face, wherein the first side face forms an acute angle with the radial direction that ranges from 2.0 degrees to 20.0 degrees, wherein the second sprocket region defines a second sprocket region axial width, and wherein the second attachment web defines a second web axial thickness that is less than the second sprocket region axial width.

2. The sprocket assembly of claim 1, wherein the single dovetail recess defines a recess outline, and wherein the single dovetail projection defines a projection perimeter that is at least partially offset from the recess outline.

3. The sprocket assembly of claim 1, wherein the single dovetail recess includes a concave arcuate surface, and wherein the single dovetail projection includes a convex arcuate surface that defines the first circumferential extremity, and wherein the convex arcuate surface is offset from the concave arcuate surface an offset distance that ranges from greater than 0 mm to 10.0 mm.

4. The sprocket assembly of claim 1, wherein the first circumferential end of the first sprocket segment is spaced circumferentially away from the second sprocket segment an offset distance that ranges from greater than 0 mm to 10.0 mm.

5. The sprocket assembly of claim 1, wherein the single dovetail recess includes a first undercut surface, and wherein the first side face contacts the first undercut surface.

6. The sprocket assembly of claim 5, wherein the single dovetail recess further includes a second undercut surface, and wherein the single dovetail projection further includes a second side face that contacts the second undercut surface.

7. The sprocket assembly of claim 1, wherein the single dovetail projection includes a first undercut surface and a second undercut surface that are flat.

8. The sprocket assembly of claim 1, wherein the first side face is flat.

9. The sprocket assembly of claim 1, wherein the single dovetail recess includes a first undercut surface, and wherein the first side face is parallel to the first undercut surface.

10. The sprocket assembly of claim 1 wherein the first sprocket segment and the second sprocket segment have identical configurations.

11. A sprocket segment comprising:

a body with an arcuate surface defining a circumferential direction, a radial direction, and an axis of rotation, the body including:

an attachment web including a first circumferential end and a second circumferential end, and a plurality of mounting apertures extending axially through the body; and a sprocket region extending radially outwardly from the attachment web and including a plurality of radially outwardly extending lugs;

wherein the first circumferential end includes a dovetail recess including:

a first side flat surface extending from the first circumferential end, a second side flat surface extending from the first circumferential end, and an arcuate bottom surface extending between the first side flat surface and the second side flat surface, wherein a length of the arcuate bottom surface is greater than a distance that is spaced away from the arcuate bottom surface in the circumferential direction and is between the first side flat surface and the second side flat surface.

12. The sprocket segment of claim 11, wherein the dovetail recess includes:

a first blend tangentially connecting the first circumferential end to the first side flat surface, and a second blend tangentially connecting the first circumferential end to the second side flat surface.

13. The sprocket segment of claim 12, wherein the dovetail recess further includes:

a third blend tangentially connecting the first side flat surface to the arcuate bottom surface, and a fourth blend tangentially connecting the second side flat surface to the arcuate bottom surface.

14. The sprocket segment of claim 11, wherein the second circumferential end is defined by a dovetail projection.

15. The sprocket segment of claim 11, wherein the first circumferential end lacks a dovetail projection, and wherein the second circumferential end lacks a dovetail recess.

16. A sprocket segment comprising:

a body with an arcuate surface defining a circumferential direction, a radial direction, and an axis of rotation, the body including:

an attachment web including a first circumferential end and a second circumferential end, and a plurality of mounting apertures extending axially through the body; and a sprocket region extending radially outwardly from the attachment web and including a plurality of radially outwardly extending lugs;

wherein the first circumferential end includes a dovetail projection including:

a first side straight surface extending from the first circumferential end, a second side straight surface extending from the first circumferential end, and an arcuate top surface extending between the first side straight surface and the second side straight surface, the arcuate top surface defining the first circumferential end, and a length of the arcuate top surface being greater than a distance that is spaced away from the arcuate top surface in the circumferential direction and is between the first side straight surface and the second side straight surface.

17. The sprocket segment of claim 16, wherein the dovetail projection includes:

a first transitional surface connecting the arcuate top surface to the first side straight surface, and a second transitional surface connecting the arcuate top surface to the second side straight surface.

18. The sprocket segment of claim 17, wherein the first transitional surface is a first radius that tangentially connects the arcuate top surface to the first side straight surface, wherein the second transitional surface is a second radius that tangentially connect the arcuate top surface to the second side straight surface, and wherein the dovetail projection includes:

a third radius that tangentially connects the first side straight surface to a first radially extending surface, and a fourth radius that tangentially connecting the second side straight surface to a second radially extending surface.

19. The sprocket segment of claim 16, wherein the second circumferential end is defined by a dovetail recess.

20. The sprocket segment of claim 16, wherein the first circumferential end lacks a dovetail recess, and wherein the second circumferential end lacks a dovetail projection.

* * * * *